(12) United States Patent
Slyne

(10) Patent No.: US 7,871,361 B2
(45) Date of Patent: Jan. 18, 2011

(54) ROTATING ROLLER TO SHAPE MOVING WEBS

(76) Inventor: William J. Slyne, PO Box 268, Markham, Ontario (CA) L3P 3J7

( * ) Notice: Subject to any disclaimer, the term of this patent is extended or adjusted under 35 U.S.C. 154(b) by 1068 days.

(21) Appl. No.: 11/534,337

(22) Filed: Sep. 22, 2006

(65) Prior Publication Data

US 2007/0072754 A1 Mar. 29, 2007

Related U.S. Application Data

(60) Provisional application No. 60/719,893, filed on Sep. 23, 2005.

(51) Int. Cl.
 *B60B 9/00* (2006.01)
(52) U.S. Cl. ....................................................... 492/21
(58) Field of Classification Search .................. 492/38, 492/21, 28, 32, 60; 156/179, 178, 177; 114/102.31
See application file for complete search history.

(56) References Cited

U.S. PATENT DOCUMENTS

| 1,779,044 | A |   | 10/1930 | Massey |
| 5,097,784 | A |   | 3/1992 | Baudet |
| 5,355,820 | A | * | 10/1994 | Conrad et al. .......... 114/102.31 |
| 5,573,716 | A |   | 11/1996 | Jacobson |
| 6,106,649 | A |   | 8/2000 | Slyne |
| 6,290,172 | B1 |   | 9/2001 | Yajima et al. |
| 6,546,867 | B1 |   | 4/2003 | Franklin et al. |
| 6,645,406 | B1 |   | 11/2003 | Slyne |
| 6,685,136 | B2 |   | 2/2004 | Yajima et al. |
| 6,843,155 | B2 | * | 1/2005 | Slyne ............................ 83/13 |
| 7,479,700 | B2 | * | 1/2009 | Takewaki et al. ............ 257/758 |

FOREIGN PATENT DOCUMENTS

WO  WO 8707233  12/1987

OTHER PUBLICATIONS

International Search Report and Written Opinion; International Application No. PCT/CA2007/001657; mailing date Feb. 7, 2008.

* cited by examiner

*Primary Examiner*—John C Hong
(74) *Attorney, Agent, or Firm*—Thomas & Karceski, PC

(57) ABSTRACT

A rotating roller imparts complex curvature onto a web of material. The roller includes a flexible outer surface and a plurality of control rings inside the rotating roller. The control rings are mounted coaxial to a central shaft and are disposed side by side along an axial length of the shaft. The outside of each ring supports a substantially circular slice of the flexible outer surface of the rotating roller. Each control ring defines a diameter that may be changed independent from the diameter of the other control rings.

15 Claims, 5 Drawing Sheets

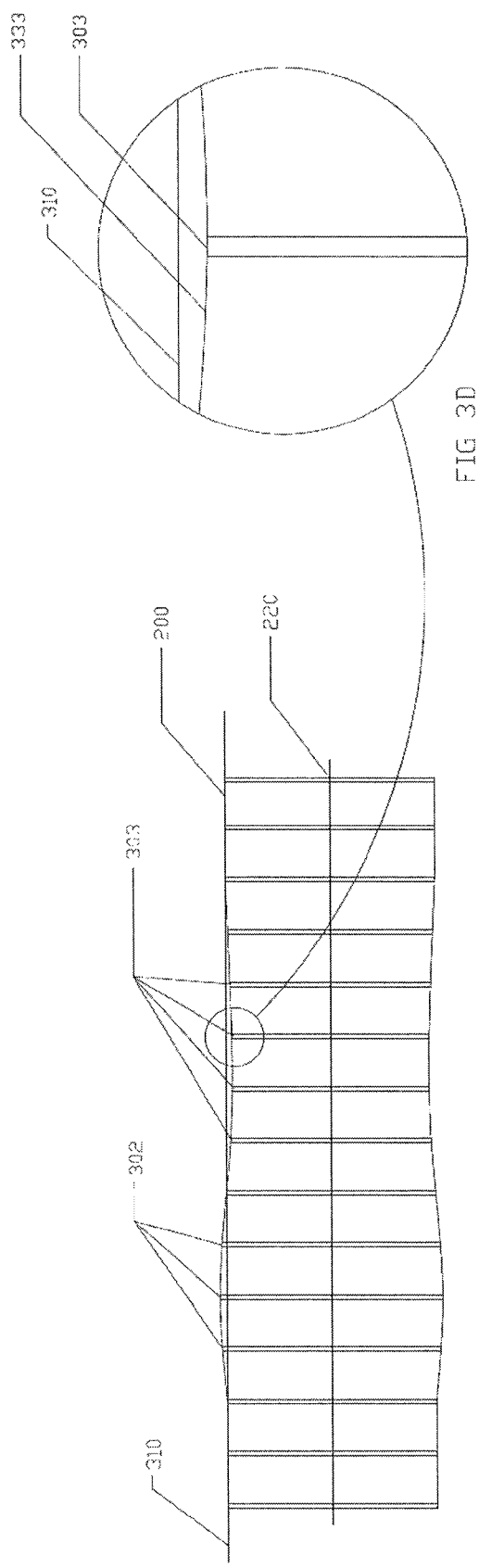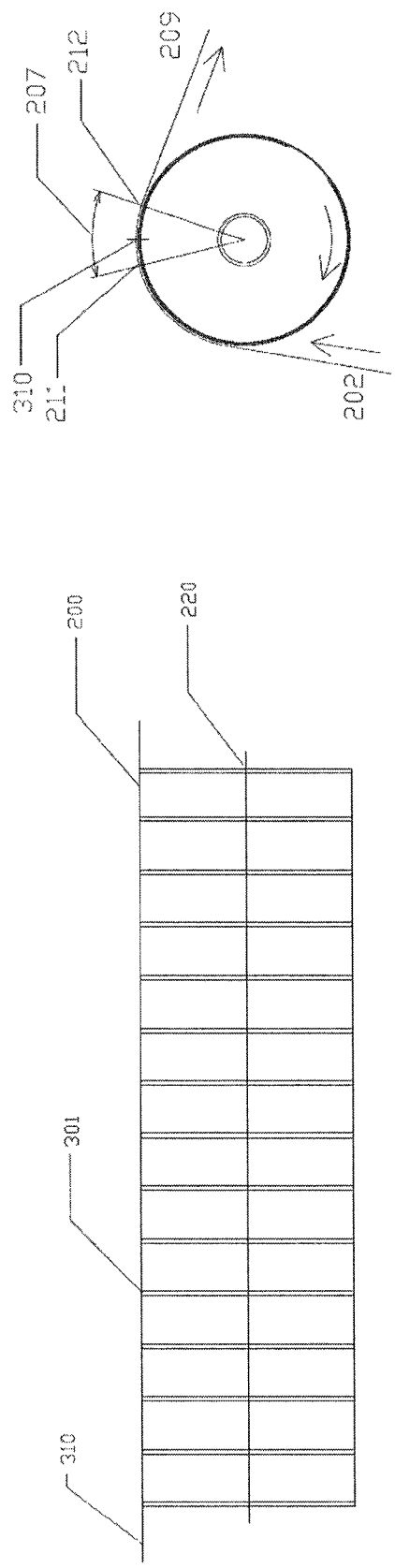

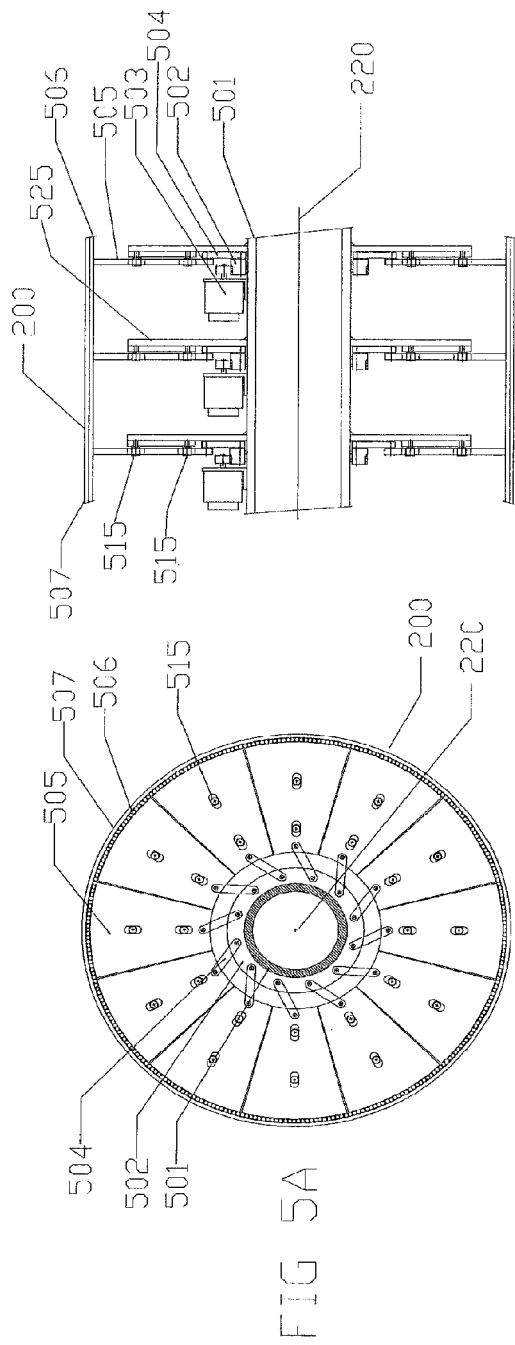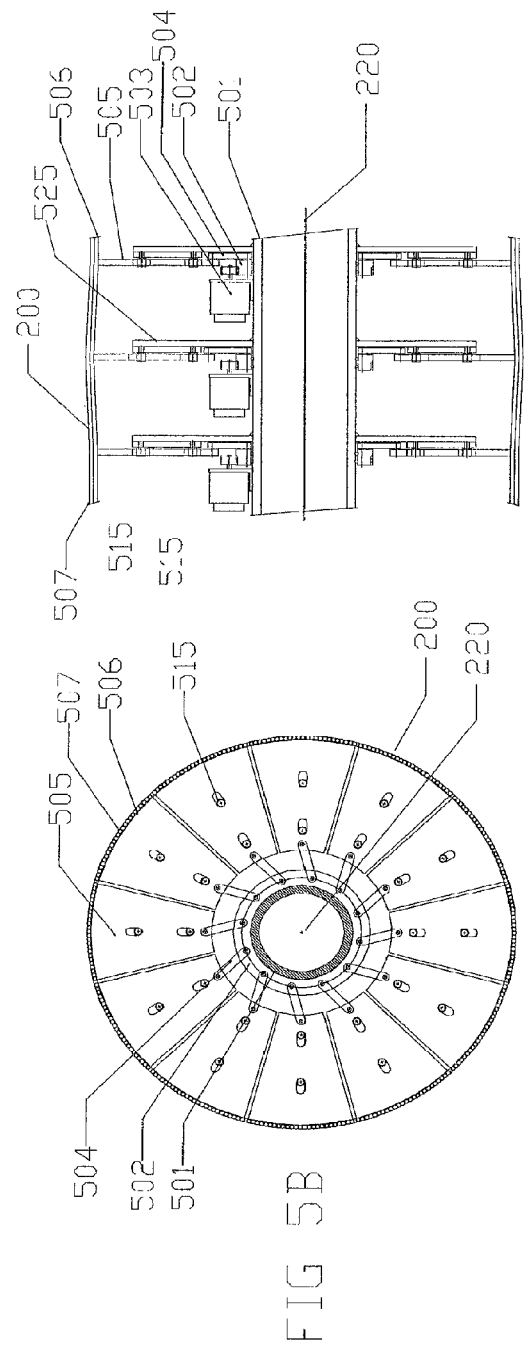

ROTATING ROLLER TO SHAPE MOVING WEBS

This application claims the benefit of U.S. Application Ser. No. 60/719,893 filed Sep. 23, 2005, which is incorporated by reference herein in its entirety.

This disclosure relates generally to machines that impart three dimensional shaping to a flexible web and further may also apply structural reinforcement elements to the web. The invention further relates to machines that synthesize a thin flexible composite structure upon the surface of a rotating roller within the machine.

BACKGROUND

Reinforced flexible films have been utilized for the fabrication of tension structures as used in buildings, sails for sailing vessels, parachutes, balloons, inflatable structures and other structures for many years. These structures have traditionally been fabricated by joining together flat pieces of fabric or film or reinforced film where the joining seam has a curvature that imparts a complex curvature onto the finished assembly. More recently, methods have been developed to fabricate these types of products where a three dimensional mold is used to laminate a reinforced film in its final three dimensional curvature.

Large flexible membranes with spherical or smoothly varying complex curvature are generally comprised of long slender membrane pieces joined along their edges where each piece is referred to as a gore. In the cases of balloons and yacht sails as used in off-wind applications, the membrane must also support a pressure differential normal to its surface. To support this pressure differential, these membranes are designed with complex three dimensional curvature and sufficient structural integrity. In the case of large research balloons, the gores run from pole to pole (bottom to top), are fabricated from a thin film and may include fiber or other reinforcement to enhance structural and barrier properties while containing low weight.

The prior art includes a product and a method to manufacture a three dimensional flexible laminated composite that requires a mold that is at least the size of the largest laminate piece to be fabricated, upon which each layer of the laminate is laid down in sequence and then subject to lamination forces to produce a three dimensional flexible laminate. An overhead gantry is utilized to lay down reinforcing fibers along arbitrary trajectories upon the mold surface. If very large pieces of laminate are to be made, the machine and the mold have to be of an equally large size.

The prior art also discloses a method to fabricate laminated flexible composites that utilizes a rotating cylindrical mold upon which the laminate is synthesized from film and fiber. The mold is comprised of a rigid cylindrical structure that can rotate under programmed control upon which are located a large number of independent radially adjustable actuators. The actuators support a flexible outer surface that is generally cylindrical, but can be deformed by the actuators to define a surface with complex curvature upon which film and fiber can be laminated to produce reinforced flexible films on a continuous basis.

The above examples have been utilized extensively for yacht sail manufacture and prototype work has been performed on tension structures and high altitude balloon pieces. Both processes contemplate the demands of shaping complex structures with significant Gaussian curvature. As a result each process requires a mold with fully independent actuators and further requires a large number of actuators. In one example, an adjustable cylindrical mold has adjustable actuators which are activated one axial row at a time as the mold turns. Each row is set to its position and stays in that position until the fabricated web is released at a later point around the arc of the mold. Along each row are disposed a number of radial actuators so that each row can have a complex and unique profile. These profiles when taken together form a complex three dimensional surface where each row is normally different from all of the other rows around the drum.

SUMMARY

The present invention solves the problem of the complexity of the prior art by limiting the mold surface distortion. The cylindrical roller in the present invention only allows that its diameter be differentially adjusted along the axis of the roller, resulting in a constant diameter all around the roller at any one specific control location along the roller longitudinal axis.

In one example, a rotating roller may impart complex curvature onto a web of material. The rotating roller is a substantially cylindrical roller having a flexible outer surface. The roller includes a plurality of control rings, the inside of each ring is mounted coaxial to a central shaft and each control ring is disposed side by side along an axial length of the shaft. The outside of each ring supports a substantially circular slice of the flexible outer surface. Each control ring defines a diameter, and the diameter of each control ring may have its diameter changed independently of the other control rings. The control rings may be disposed equidistantly from the next adjacent ring along the axial length of the central shaft. The diameter of each control ring may be changeable in diameter in a continuous or in a stepped manner. Each control ring may be mounted concentrically on the central shaft. The outer surface of the roller may comprise apertures open on one end to the outside of the roller and on an opposite end to a cavity inside the roller, and the cavity inside the roller is in fluid communication with a vacuum pump for creating a vacuum on the surface of the roller. The outer surface of the roller may be a silicone sleeve. Each control ring may comprise a drive ring mounted rotatably around a central shaft. The drive ring may be operatively connected to an actuator that is adapted to rotatably move the drive ring around the central shaft. The control ring further includes a plurality of pie-shaped segments, each attached to one end of a link arm, and each link arm attached on its opposite end to the drive ring. The pie-shaped segments may be guided by a roller mechanism that is fixed to the central shaft, wherein each pie-shaped segment can only move substantially radially and all pie-shaped segments of a specific control ring move radially by an equal amount simultaneously with the movement of the drive ring, whereby this movement causes the diameter of each respective control ring to change.

BRIEF DESCRIPTION OF DRAWINGS

FIGS. 3A and 3B are front and side crosssectional views of a roller that is substantially round with no three dimensional shape.

FIGS. 3C and 3D illustrate front and crosssectional side views respectively of a roller having control rings that have different size diameters, and thereby impart some Gaussian curvature to a web.

FIGS. 5A and 5B disclose side elevation and longitudinal cross-sectional views of a control ring mechanism used to control the diameter of a rotating roller in accordance with an example of the present invention.

DETAILED DESCRIPTION

Figure 1:
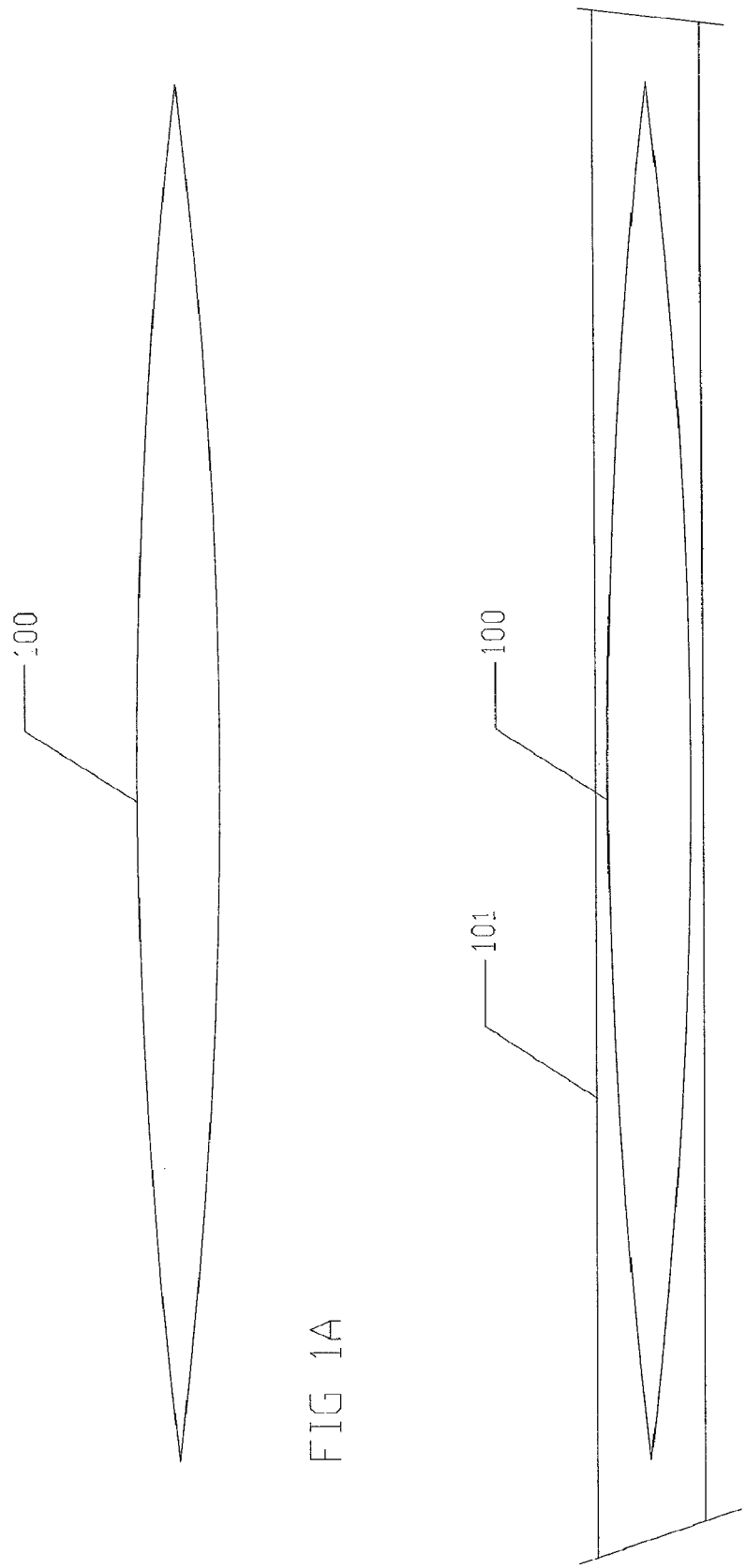
FIG. 1A is a top plan view of a piece of fabricated film.
FIG. 1B is a top plan view of the fabricated piece of film shown in FIG. 1A within a film web.

The present invention is an apparatus for use especially in the formation of long narrow flexible film pieces that have small and slowly varying curvature, such as would be required for instance by high altitude balloon gores that have a length to width ratio of more than 20 and normally more than 100. As the length to width ratio increases, the rate of change of Gaussian curvature along the length of the gore decreases. The present invention exploits the fact that a web with a slowly changing Gaussian curvature can be shaped on an apparatus that has a much simpler design, can operate at higher operating speeds and be smaller and less costly to design and fabricate than that disclosed in the prior art.

The present invention is based on a rotating cylindrical roller that is comprised of an outer flexible skin, normally an elastomer skin, supported upon a number of flexible rods each aligned axially side-by-side. The rods are supported upon a number of adjustable rings (referred to herein as "control rings"), each mounted coaxially to a single control shaft. The control rings are all generally of the same design and size, for example each with a 24" diameter and is able to change diameter continuously or in a stepped manner from 24" to 25". The rings are disposed axially along the common shaft, and may be positioned such that the space between each ring is uniform. Each ring can adjust its diameter continuously and independently of the other rings. From a structural perspective, each control ring is made up of a number of components that actually contact and support the flexible rods and elastomer skin. Each control ring supports a substantially circular slice of the flexible outer surface.

When all of the control rings are set at the same diameter, the outer surface of the rotating roller assumes the curvature of a cylinder with its axis common to the central shaft axis. This configuration has a Gaussian curvature of zero. When the control rings at the middle location along the shaft have a diameter smaller than the rings towards both ends of the shaft, the curvature is generally that of an hourglass, and such a surface would have a negative Gaussian curvature. Alternatively, if the rings at the middle location along the shaft have a diameter larger than the rings towards both ends of the shaft, the curvature is generally that of a barrel and such a surface would have a positive Gaussian curvature.

In practice the rotating roller is used to add shape to a passing web, to synthesize a web from a homogeneous or composite material or to both shape and reinforce a passing web. An example of the practical use of the rotating roller is for the shaping of flat thermoplastic films. In this case a film web is pulled around the roller and is in tangent contact with the surface of the roller for a limited amount of the arc of the roller, for example 20 degrees of arc or about 5% of the roller surface around the arc of the roller. For a 24" diameter roller, for instance, this arc would be 4.2" long. For a long web piece with slowly changing complex curvature, this 4.2" dwell would not be a problem as the film would be presented with a very consistent form. For a web piece with a quickly changing complex curvature, 4.2" may be too large as the mold roller control rings are being adjusted quickly and the film in contact with the mold roller would not be presented with a very consistent form from which to acquire its curvature. This arc where the mold roller shape is impressed upon the web is referred to as the rotating roller dwell.

The amount of rotating roller dwell required by a particular web shaping application is a function of the web stiffness and the rate of change of complex curvature along the web travel direction. As either web stiffness or the rate of change of complex curvature increase, the roller diameter, the roller dwell or both can be decreased.

The present invention will be described in an exemplary manner as applied to the shaping and reinforcing of a single thermoplastic film with fibers bonded to one side.

FIG. 1A shows a film piece or gore 100 to be fabricated. The gore 100 represents a pole-to-pole gore for a spherical balloon. Such a balloon would be comprised of an assembly of such gores 100, each gore joined along its edges to adjacent gores forming an impervious spherical membrane.

FIG. 1B shows the gore 100 perimeter within the film web 101 from which the gore will be fabricated. The figure shows the two dimensional plan view of the gore 100. However, the area bounded by the gore perimeter would have generally non-zero Gaussian curvature.

Figure 2:
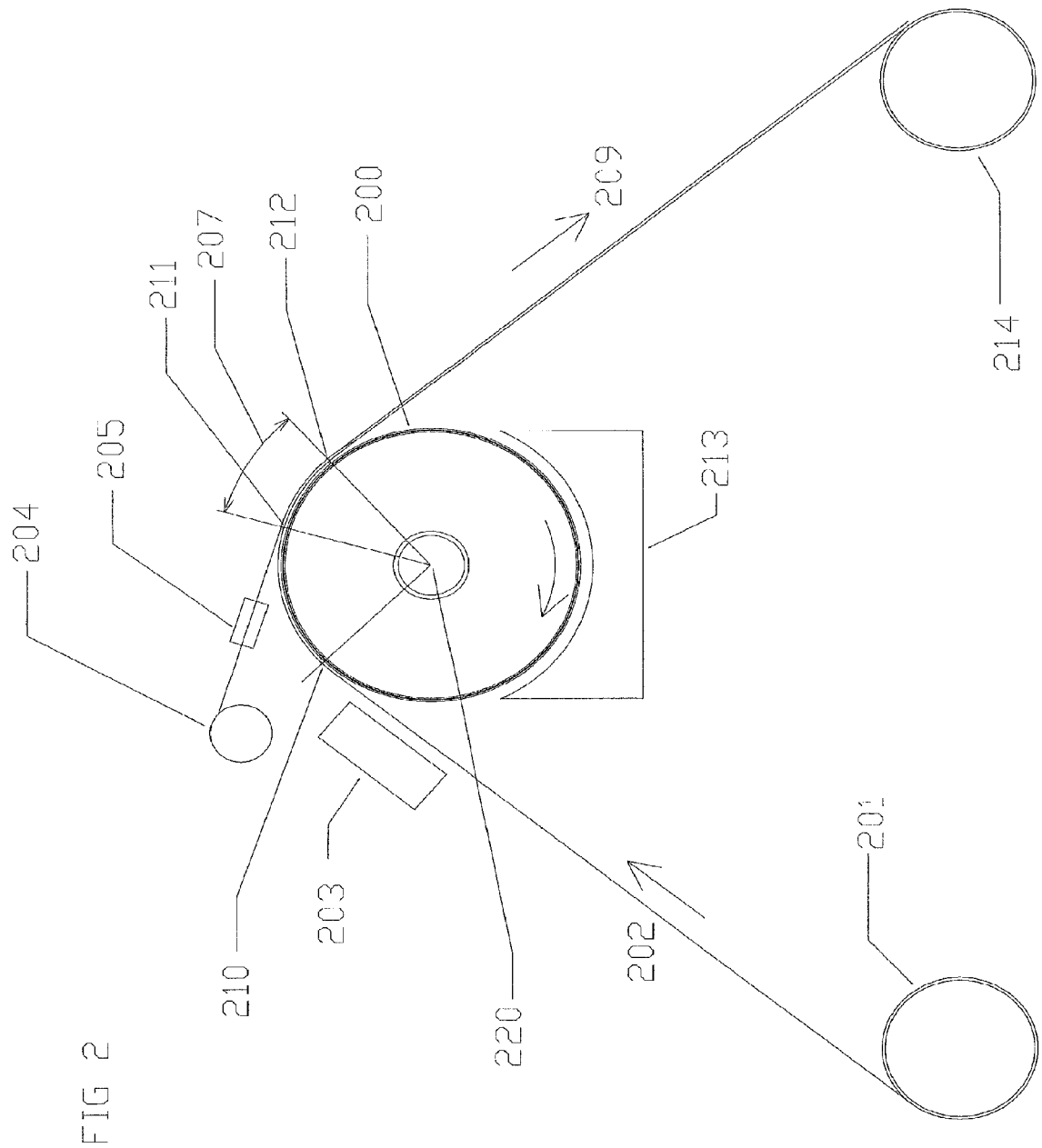
FIG. 2 is a side elevation view of a rotating roller for imparting complex curvature onto a web of material.
Figure 4:
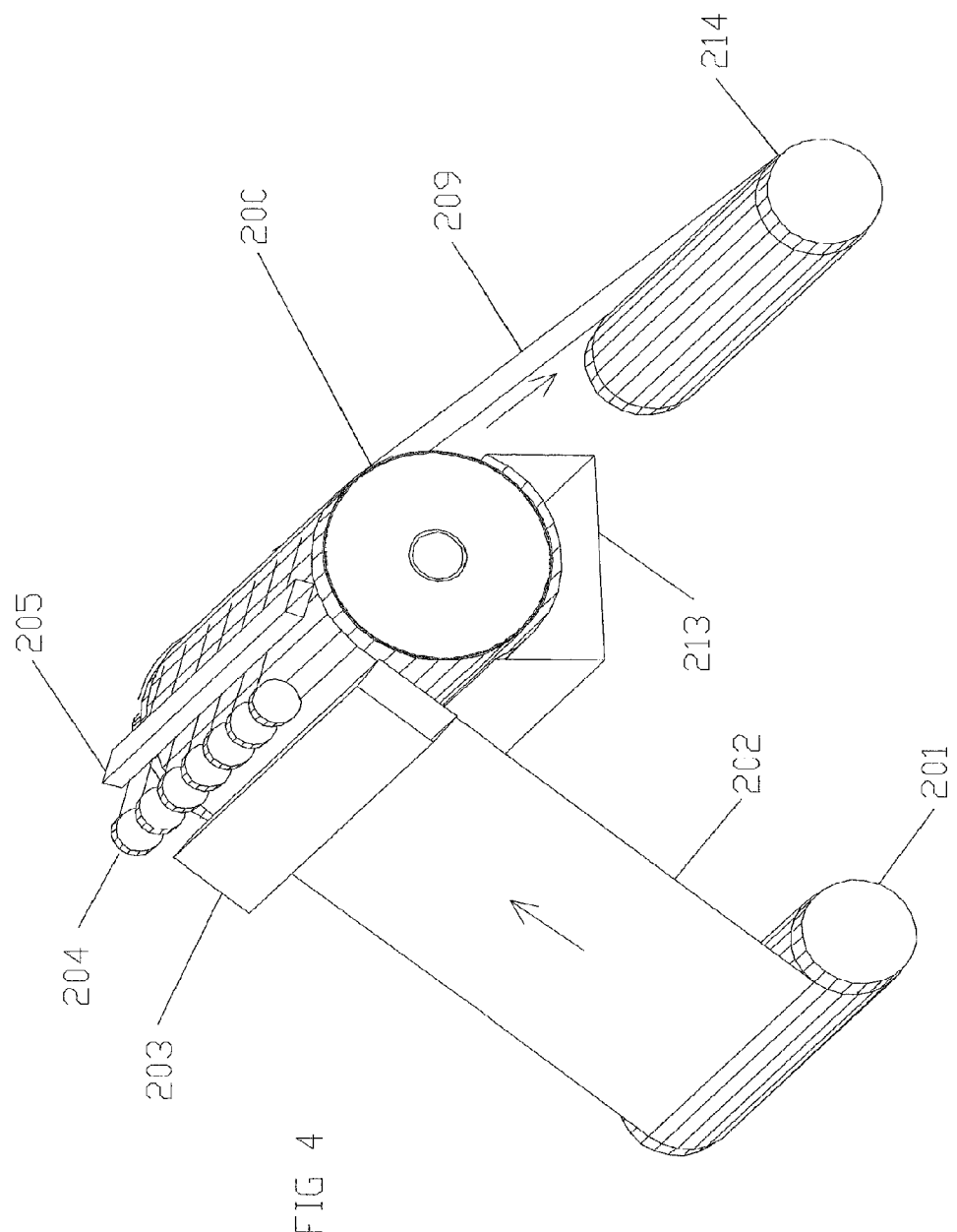
FIG. 4 is a perspective view of an adjustable diameter rotating roller system.

FIG. 2 and FIG. 4 show an adjustable diameter rotating roller 200 system (not shown are control motors, mechanical transmissions, computer control systems, electrical connections, vacuum pumps or associated plumbing). Also the rotating roller 200 is shown with all control rings (not shown) at the same diameter. Flat film 202 is pulled from a supply roll 201 and heated by a forced air heater 203 to allow it to thermally form onto the roller 200 at arc location 210. The roller 200 outer surface is perforated with small apertures (not shown) where each aperture is in fluid communication with a valve arrangement such that discrete portions of the mold roller arc may be independently connected through to a vacuum pump (not shown). In the example disclosed here, the rotating roller 200 surface is segmented into 72 equally sized zones, each spanning 5 degrees of arc. This provides for the ability to have only the roller dwell location 207, that portion of the arc under the film 202 in contact with the roller 200 to have vacuum.

Yarns from fiber spools 204 which may be pre-coated with adhesive are applied to the film 202 at arc position 211 on the rotating roller 200 surface. The adhesive on the yarn or the yarn itself is in a softened or tacky state after passing through the yarn heater 205. The wrapping tension of the fiber around the roller arc 207 causes the yarn to press against the film surface where it is cooled by the roller surface to cause the adhesive to bond the yarns to the film. The reinforcing yarn spools 204 are independently controlled such that each can be positioned along an axis that is parallel to the axis 220 of the rotating roller. Each yarn spool 204 has a servo motor that can dynamically position each spool along this axis. This motion allows for the positioning of the yarns on the film surface to follow curved trajectories. Compaction rollers (not shown) disposed with one compaction roller over each yarn may also be used to further compress and bond the yarn to the film. These compaction rollers would be distributed along the Y-axis within roller dwell 207.

The arc starting at position 211 and ending at position 212 is the location on the arc of the drum where the complex curvature of the roller 200 matches the complex curvature of the design of the film article of manufacture. The control software is constantly changing the diameters of the control rings along the roller axis 220 so that the complex curvature is valid in this arc 207. Since the change in Gaussian curvature along the long axis of a long slender balloon gore is small, this arc 207 will be sufficiently large enough to allow the deposition and bonding of the reinforcing fibers on a mold that is a sufficiently accurate isometric mapping of the design surface of the balloon gore. Despite the fact that the rotating roller has a single valued diameter at each control ring, the portion of the gore in fabrication that is in contact with the rotating roller is very small and therefore has almost constant dimensions and curvature for this small portion. After the reinforced film web 209 leaves the surface of the roller at 212, it is wound under low tension onto take-up roll 214. The roller drive motor and transmission provide the power to pull the film 202 from the film supply roll 201 and through the mold roller dwell 207. The web take-up roll 214 supplies only moderate web tension to the web 209 exiting the mold roller 200 in order to prevent slack. Since the yarn heater and film heater are constantly adding heat to the process, in some cases there will be the need for some form of surface cooling applied to the roller 200. A cooling system 213 is simply a forced air cooling system utilizing ambient air or refrigerated air. The heating and cooling systems each have feedback control allowing them to maintain constant temperature. Lastly, the boundary of the gore may be cut (not shown) utilizing a method and apparatus such as for instance the one disclosed in U.S. Pat. No. 6,845,406, where two or more cutting means contour cut the edges of the gore while it is still on the surface of the roller.

The roller 200 has a computer control and associated motors, actuators and sensors to rotate the roll at a precise speed, position the independent motor actuators on each of the control rings and the reinforcing applicators in coordination such that the completed gore has the complex curvature and reinforcing of the design.

Transverse yarns or reinforcing (not shown) may also be applied to the web. Spherical balloon gores require a precise matching of transverse fibers or reinforcing so that a generally continuous structural member is provided that spans gores and crosses seams essentially uninterrupted. This transverse reinforcing would be applied in the arc 207.

FIG. 3A shows normal and side views of the rotating roller 200 detailed in FIG. 2 with the locations of the control rings 301 indicated. A reference line 310 is also shown for comparison between the roller control ring diameters in FIG. 3A and FIG. 3C. The side view FIG. 3B shows the web entering 202 and exiting 209 the roller 200. The reference line 310 runs normal to the page and is located top dead center on the roller surface. In FIG. 3A all control rings 301 are at the same extension, all surface points are in contact with the reference line and the resulting mold roller surface has zero Gaussian curvature at all locations. When all control rings are at the same extension, the web produced would not have any complex curvature and would be flat.

FIG. 3C shows only the view normal to the rotating roller 200 axis 220. In FIG. 3C, the control rings have different values of extension where some are at the original diameter as in FIG. 3A, some control rings are at an increased diameter 302 and some are at a decreased diameter 303 as indicated relative to the reference line 310 which is in the same location as FIG. 3A. The web produced when the mold roller has control rings that are at non-uniform diameters will have complex curvature only if the roller profile is curved. FIG. 3D shows a close-up detail of the edge of the roller 200. It is clear that the control ring 303 and hence the mold roller surface are below the reference line 310 and that the mold roller surface in this region has negative Gaussian curvature.

FIGS. 5A and 5B show the inner workings of one preferred embodiment of the control ring mechanism used to control the diameter of a rotating roller 200. The roller 200 in this example has a nominal diameter of 24" and a length of 84". There are fifteen control rings equally spaced along the roller shaft 501. The roller shaft is a 6" diameter steel tube with a ⅜" thick wall. So that close detail is visible, only three of the fifteen adjustable rings are shown.

FIG. 5A shows the roller 200 in the "flat" or cylindrical form. FIG. 5B shows the middle control ring of the roller 200 expanded from a 24" diameter to a 24.5" diameter. Each ring has a drive ring 502 that can be rotated around the shaft 501 under the control of a servo motor 503 with an encoder and engaged to the rotating ring rotatin with a pinion gear and ring gear. A non rotating, pie shaped segment 505 is attached by a link arm 504 to the rotating ring 502. The pie segment 505 is guided by two rollers 515 each attached to plate 525, where each plate 525 is attached to the shaft 501 so that the segment 505 can only move radially.

Continuous rods 506 run the length of the mold roller, there are 305 pieces of ¼" square aluminum rod positioned side by side around the perimeter of the roller in this example. When the roller is adjusted to its minimum diameter, the rods are in parallel side-by-side contact with each other. As the various rings at the control locations have their diameters independently increased small spaces between the rods begin to form. A one piece perforated silicone sleeve 507 forms the outside surface of the mold roller. This silicone sleeve spans the gaps between the ¼" square rods.

The perforations in the silicone are to provide a fluid communication between the outer surface of the silicone skin through the roller to a vacuum pump (not shown). This vacuum holds the film to the drum over its entire surface or just over the arc portion 207 where construction and shaping of the reinforced films take place.

The method and apparatus disclosed is optimized for the molding of flexible films, flexible composites and flexible laminated composite where the Gaussian curvature changes slowly along the longitudinal direction of the flexible product and may be advantageous in the manufacture of any of the following:

Shaping monofilm balloon gores;
Shaping and reinforcing single film flexible composites;
Shaping, reinforcing and laminating sandwich composites;
One piece windsurf sails;
Sections of yacht sails and windsurf sails;
One piece or sections of sails for sporting equipment;
One piece or sections of inflatable structures for architecture or utility;
One piece or sections of aerospace or space based products.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A rotating roller for imparting complex curvature onto a web of material or as a mold surface for the synthesis of webs with complex curvature, the rotating roller comprising:
   a substantially cylindrical roller having a flexible outer surface;
   a plurality of control rings, the inside of each ring mounted coaxial to a central shaft and disposed side by side along an axial length of the shaft, and the outside of each ring supporting a substantially circular slice of the flexible outer surface;
   wherein each control ring defines a diameter, and the diameter of each control ring may have its diameter changed independent from the other control rings.

2. A rotating roller as described in claim 1, wherein each control ring is disposed equidistantly from the next adjacent ring along the axial length of the central shaft.

3. A rotating roller as described in claim 1, wherein the diameter of each control ring is changeable in diameter in a continuous manner.

4. A rotating roller as described in claim 1, wherein the diameter of each control ring is changeable in diameter in a stepped manner.

5. A rotating roller as described in claim 1, wherein each control ring is mounted concentrically on the central shaft.

6. A rotating roller as described in claim 1, wherein the outer surface of the roller comprises apertures open on one end to the outside of the roller and on an opposite end to a cavity inside the roller; and
   the cavity inside the roller is in fluid communication with a vacuum pump for creating a vacuum on the surface of the roller.

7. A rotating roller as described in claim 1, wherein the outer surface of the roller is comprised of a silicone sleeve.

8. A rotating roller as described in claim 1, wherein each control ring comprises:
   a drive ring mounted rotatably around the central shaft, the drive ring operatively connected to an actuator that is adapted to rotatably move the drive ring around the central shaft;
   a plurality of pie-shaped segments, each attached to one end of a link arm, and each link arm attached on its opposite end to the drive ring;
   the pie-shaped segments guided by a roller mechanism that is fixed to the central shaft, wherein each pie-shaped segment can only move substantially radially;
   whereby movement of each drive ring causes the diameter of each respective control ring to change.

9. A rotating roller for imparting complex curvature onto a web of material or as a mold surface for the synthesis of webs with complex curvature, the rotating roller comprising:
   a substantially cylindrical roller having a flexible outer surface;
   a control ring, the inside of the ring mounted coaxial to a central shaft along an axial length of the shaft, and the outside of the ring supporting a substantially circular slice of the flexible outer surface;
   wherein the control ring defines a diameter, and the diameter of the control ring may have its diameter changed.

10. A rotating roller as described in claim 9, wherein the diameter of the control ring is changeable in diameter in a continuous manner.

11. A rotating roller as described in claim 9, wherein the diameter of the control ring is changeable in diameter in a stepped manner.

12. A rotating roller as described in claim 9, wherein the control ring is mounted concentrically on the central shaft.

13. A rotating roller as described in claim 9, wherein the outer surface of the roller comprises apertures open on one end to the outside of the roller and on an opposite end to a cavity inside the roller; and
    the cavity inside the roller is in fluid communication with a vacuum pump for creating a vacuum on the surface of the roller.

14. A rotating roller as described in claim 9, wherein the outer surface of the roller is comprised of a silicone sleeve.

15. A rotating roller as described in claim 9, wherein the control ring comprises:
    a drive ring mounted rotatably around the central shaft, the drive ring operatively connected to an actuator that is adapted to rotatably move the drive ring around the central shaft;
    a plurality of pie-shaped segments, each attached to one end of a link arm, and each link arm attached on its opposite end to the drive ring;
    the pie-shaped segments guided by a roller mechanism that is fixed to the central shaft, wherein each pie-shaped segment can only move substantially radially;
    whereby movement of each drive ring causes the diameter of the respective control ring to change.

* * * * *